Oct. 8, 1957     E. H. JOHNSON     2,809,045

LEVER ACTUATED CHUCK

Filed May 6, 1955

*INVENTOR.*
ERNEST H. JOHNSON
BY
ATTORNEY.

United States Patent Office 2,809,045
Patented Oct. 8, 1957

2,809,045

LEVER ACTUATED CHUCK

Ernest H. Johnson, Bridgeport, Conn., assignor to The Bullard Company, a corporation of Connecticut Application May 6, 1955, Serial No. 506,561

6 Claims. (Cl. 279—118)

The present invention relates to machine tools, and particularly to a new and improved chuck that will automatically seat the work during the chucking operation.

Prior-known chucks embody radially-movable chuck jaws that move in a single plane during a chucking operation. As the chuck jaws grip the work they invariably cause the work to move slightly away from the face of the chuck. This occasioned pounding of the work to effect its proper seating relatively to the chuck. Additionally, these prior-known chucks invariably employ T-slot constructions within which the radially-movable jaws slide. These T-slot constructions are such that excessive binding forces are created and required to be overcome during the chucking operation of work.

The principal objects of the present invention are to provide a chuck in which the pounding of the work by the operator is eliminated; and the provision of such a chuck in which no binding forces are required to be overcome during the chucking operation.

Other objects include the provision of a chuck embodying radially-movable chuck jaws that tend automatically to seat the work relatively to the chuck as the chuck jaws are moved into chucking engagement with the work; the provision of such a chuck in which a parallelogram form of linkage is provided between the chuck jaw and the chuck base such that the chuck jaw can be moved radially, but along an arc of a circle; the provision of such a chuck in which the arcuate movement of the radially-movable chuck jaw causes it to move toward the base of the chuck as it engages the work; and the provision of such a chuck in which one link of a parallelogram linkage between the chuck jaw and base is in the form of a bell crank adapted to be oscillated by a reciprocable draw bar.

The above, as well as other objects and novel features of the invention will become apparent from the following specification and the accompanying drawings, in which.

Figure 1:
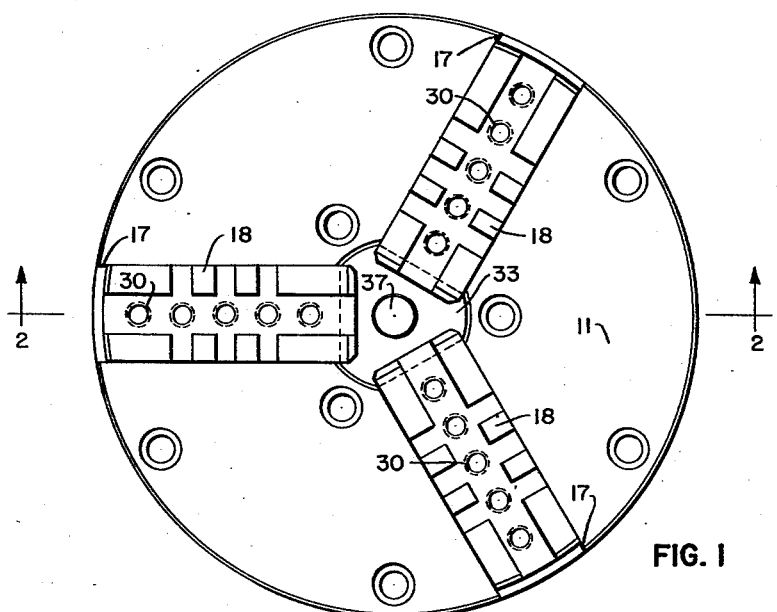
Figure 1 is a top plan view of a machine tool chuck to which the principles of this invention have been applied.
Figures 2, 3:
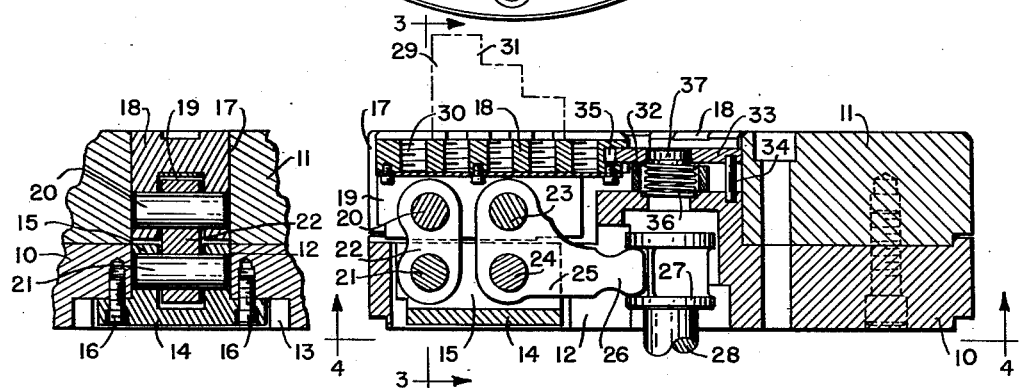
Fig. 2 is a sectional elevational view taken substantially along line 2—2 of Fig. 1.
Fig. 3 is a sectional elevational view taken substantially along line 3—3 of Fig. 2.
Figure 4:
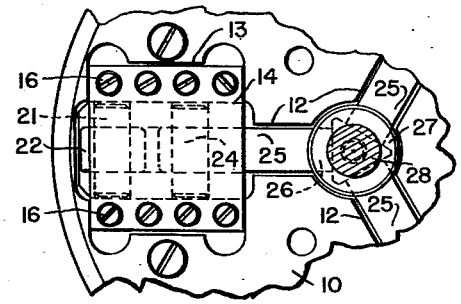
Fig. 4 is a bottom plan view looking in the direction of the arrows along line 4—4 of Fig. 2.

Referring to the drawings, the invention is shown as applied to a machine tool chuck comprising a lower base portion 10 and an upper base portion 11. The lower base portion is provided with three radial slots 12 that are recessed at 13 (Fig. 3) to receive a flange 14 of a trunnion support 15. In the present embodiment, the trunnion support 15 is bolted to the lower portion 10 by bolts 16, although it may be held in place by a boltless construction by providing a closed bottom to the slots 12 in the lower portion 10 of the chuck base. The upper portion of the base 11 is provided with three radially-disposed slots 17 having plain, uninterrupted sidewall surfaces which, when the lower and upper portions 10 and 11 are assembled, are aligned with corresponding surfaces of the slots 12. The slots 17 are adapted to receive lower jaws 18 of the chuck jaw construction. Each lower jaw 18 is provided with a radially-extending slot 19 forming a bifurcated construction across which extends a trunnion 20. Another trunnion 21 extends across the bifurcated construction of the trunnion support 15, and a link 22 is connected to the trunnions 20 and 21. Additional trunnions 23 and 24 are mounted in the lower jaw 18 and the trunnion support 15 (Fig. 2). A bell crank lever 25 is connected to the trunnions 23 and 24, forming with link 22, trunnion support 15 and lower jaw 18, a parallelogram linkage, wherein the trunnion support 15 is a fixed link. The construction and arrangement of the parts are such that oscillatable movement of the bell crank lever 25 causes the lower jaw to move along an arc of a circle. The bell crank lever 25 is provided with the usual type of connector 26 that cooperates with a spool 27 formed at the top of a draw bar 28. Draw bar 28 is located along the axis of rotation of the chuck and is adapted to be reciprocated to effect the oscillation of the bell crank 25 to thereby arcuately move the lower jaws 18. A top jaw 29 is adapted adjustably to be located along the top surface of the lower jaw 18 and to be anchored thereto by bolts cooperating with threaded holes 30 within the lower jaw 18. The construction and arrangement of the parallelogram linkage including the link 22 and lever 25 is such that as the bell crank lever 25 is oscillated, it moves the top jaw 29 along an arc of a circle such that its work-engaging surface 31 is always maintained in a plane parallel to the axis of rotation of the chuck. In this way, the full effective gripping surface of the top jaw 29 acts at all times during the application of gripping pressure to effectively act on the work surface. Additionally, the arcuate path of movement of the top jaw 29 is such that it is moved toward the chuck base during the actual gripping of the work. This automatically effects proper seating of the work on the chuck and thereby eliminates the conventional pounding of the work by the operator prior to a machining operation. Inasmuch as the top jaw 29 can be moved from a high point of the arcuate path toward the base 11, both toward and away from the axis of rotation of the chuck, the top jaw 29 may be effective not only for external gripping but also for internal gripping, and still effect automatic proper seating of the work on the chuck.

In order to prevent the jaws 18 moving inwardly beyond a predetermined point, a floating stop collar 32 is mounted on a surface of the lower portion 10 of the chuck. In order to prevent chips and dirt from passing into the linkage mechanism of the chuck through the opening between the inner ends of the jaws 18, a cover plate 33 is mounted in fixed relation to the surface supporting the floating stop 32 by dowel pin 34. The construction is such that the disc 33 is permitted slight vertical movement, but prevented from moving transversely to the axis of rotation of the chuck. Each of the lower jaws 18 is provided with a slot 35 in its inner end that receives the plate 33 for relative sliding action. The dimension of the slots 35 is such that normal movement of the lower jaw 18 can be effected without abutting against the outer peripheral edge of the plate 33. In order to maintain a sliding seal between the top of the plate 33 and the top surfaces of the slots 35 in the lower jaws 18, a compression spring 36 is provided. The spring 36 is held in place by a plug 37 that is removably pressed into an opening centrally of the plate 33.

Although the various features of the improved chuck have been shown and described in detail to fully disclose one embodiment of the invention, it will be evident that numerous changes may be made in such details, and cer-

What is claimed is:

1. In a chuck, a base; radially-disposed slots within said base having plain, uninterrupted side-wall surfaces; a jaw within each slot adapted to float between said side walls; and means for moving said jaw along an arcuate path between said side walls into and out of gripping engagement with a workpiece.

2. In a chuck, a base; radially-disposed slots within said base having plain, uninterrupted side-wall surfaces; a jaw within each slot adapted to float between said side walls; and a linkage for moving said jaw along an arcuate path between said side walls, said linkage being so arranged that the gripping surface of said jaw remains at all times in a plane parallel to the axis of rotation of said chuck.

3. In a chuck, a base; radially-disposed slots within said base having plain, uninterrupted side-wall surfaces; a jaw within each slot adapted to float between said side walls; and a linkage for moving said jaw along an arcuate path between said side walls, said linkage being so arranged that the gripping surface of said jaw remains at all times in a plane parallel to the axis of rotation of said chuck, and said gripping surface moves toward said base as it grippingly engages a workpiece, whereby said workpiece is seated on said chuck jaw.

4. In a chuck, a base; radially-disposed slots within said base having plain, uninterrupted side-wall surfaces; a jaw within each slot adapted to float between said side walls; a linkage between said jaw and base forming a parallelogram construction; and means for oscillating one arm of said parallelogram linkage to effect arcuate movement of said jaw between said side walls.

5. In a chuck, a base; radially-disposed slots within said base having plain, uninterrupted side-wall surfaces; a jaw within each slot adapted to float between said side walls; two oscillatable links arranged in parallel relation between said jaw and said base, in such manner that said base comprises a rigid link and the jaw and two parallel links combine with said rigid link to provide a parallelogram construction, whereby upon oscillation of one of said parallel links, said jaw is caused to move in an arcuate path between the side walls of said slots.

6. In a chuck, a base; radially-disposed slots within said base having plain, uninterrupted side-wall surfaces; a jaw within each slot adapted to float between said side walls; a link pivotally connecting said jaw to said base; a bell crank link having one leg thereof parallel with said previously-mentioned link and pivoted to said base and jaw construction in parallel relation to said other mentioned link; and a draw bar mounted along the axis of rotation of said chuck and adapted to engage the free end of the bell crank lever.

References Cited in the file of this patent

UNITED STATES PATENTS

| | | |
|---|---|---|
| 1,124,692 | Boax | Jan. 12, 1915 |
| 2,420,128 | Fisher | May 6, 1947 |